Patented Sept. 27, 1938

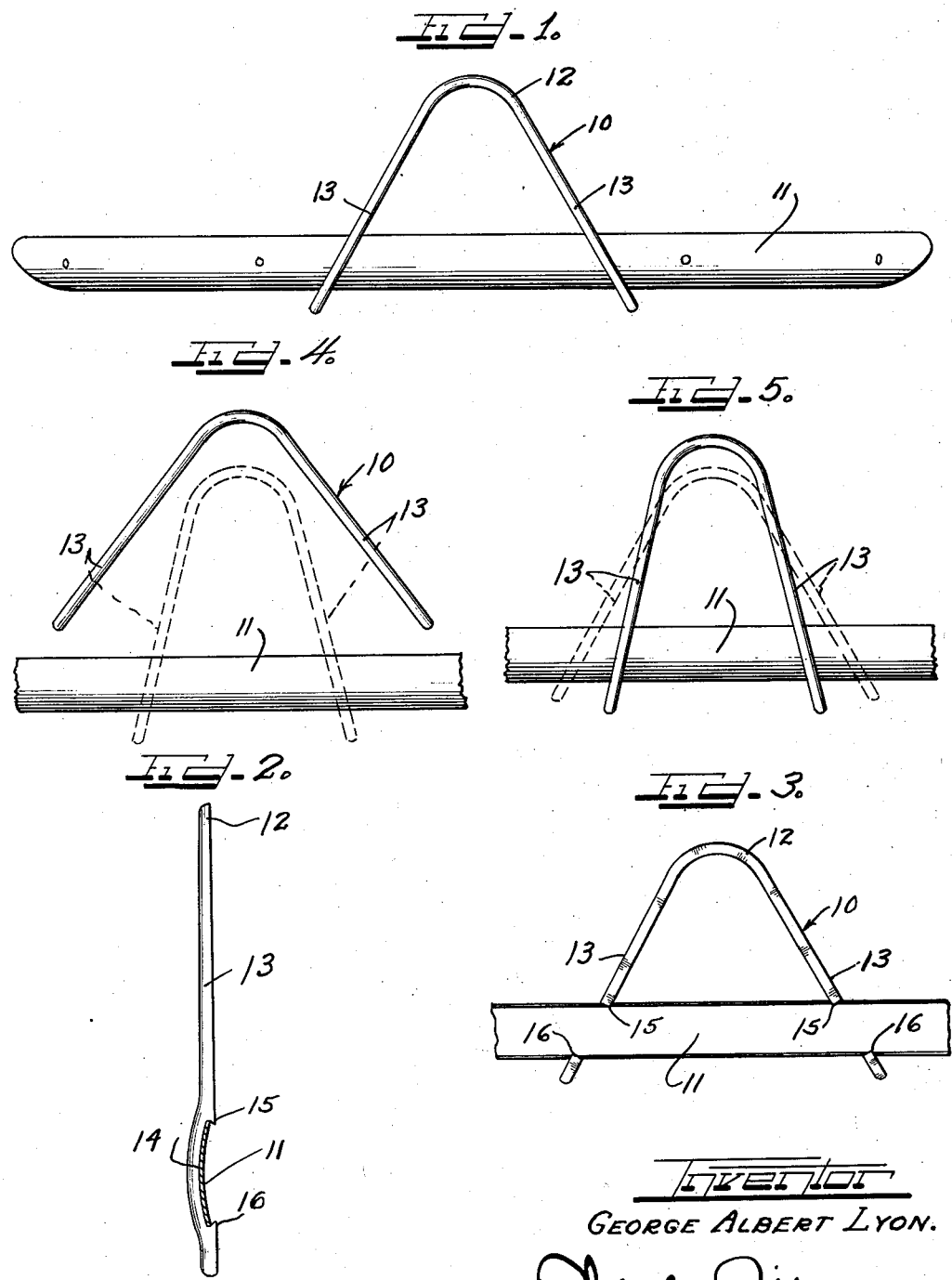

2,131,059

UNITED STATES PATENT OFFICE 2,131,059

SNAP-ON ORNAMENTAL GRILLE GUARD

George Albert Lyon, Allenhurst, N. J.

Application July 29, 1937, Serial No. 156,284

8 Claims. (Cl. 293—55)

This invention relates to a snap on ornamental grille guard or impact member, and more particularly to an ornamental bumper accessory which is adapted to be snapped into desired position on a vehicle bumper to increase the protection afforded by the latter.

The ordinary motor vehicle of the present day is provided with a front and rear impact member which is commonly known as a "bumper". These impact members or bumpers afford a substantial measure of protection to the front and rear of the motor vehicle but it has been found that in many instances a collision or accident occurs in which some obstacle extends over the top of the impact member or bumper and damages a portion of the car. This has been found particularly true with respect to the front impact member or bumper. In view of the fact that many motor vehicles of the present day are provided with an ornamental cast grille radiator front which is relatively expensive to manufacture and costly to replace, it has been found desirable in many instances to provide an auxiliary impact member on the front bumper. For such an auxiliary impact member to be commercially satisfactory, it is desirable that it be constructed in such a manner that it will withstand any ordinary shock or collision and it must also be capable of being readily and quickly mounted on the bumper.

It is an object of this invention to provide a novel impact member possessing the above highly desirable characteristics.

Another object of this invention is to provide a novel auxiliary impact member to be mounted on the usual form of vehicle bumper which is economical to manufacture and which is rugged and reliable in use.

A further object of this invention is to provide a novel snap-on impact member for vehicle bumpers.

A still further object of this invention is to provide a novel form of bumper accessory having novel means thereon for detachably securing the accessory to a vehicle bumper.

Another and still further object of this invention is to provide a novel snap-on ornamental grille guard and a novel method and means for mounting the same on a vehicle bumper.

The novel features which I believes to be characteristic of my invention are set forth with particularity in the appended claims. My invention itself, however, both as to its organization and manner of construction, together with further objects and advantages thereof may best be understood by reference to the following description, taken in connection with the accompanying drawing, in which:

Figure 1 is a front elevational view of a snap-on ornamental grille guard or impact member mounted on a vehicle bumper;

Figure 2 is a side elevational view partly in cross-section of the ornamental grille guard and bumper of Figure 1, which shows the means by which the grille guard is mounted on the bumper;

Figure 3 is a rear view of the ornamental grille guard and the central portion of the bumper of Figure 1;

Figures 4 and 5 illustrate the manner in which the grille guard is mounted on the vehicle bumper.

In the various figures of the drawing, an embodiment of this invention is illustrated which includes an inverted V-shape impact member 10 mounted on a vehicle bumper 11. The impact member 10 is formed of spring steel which is of substantially inverted V-shape. The thickness of the material near the apex 12 of the member is slightly less than the thickness of the legs in order to render the member 10 more flexible at the apex. This does not detract from the impact resisting properties of the member 10 since the substantial burden of any impact or collision is borne by the legs 13 of the member. Near the lower end of the legs 13 of the impact member 10, the rear of the legs are cut or shaped to intimately overlie the front face of the bumper 11 when the member 10 has been mounted in desired position. This portion of each leg 13 which intimately overlies the front face of bumper 11 has been given the reference numeral 14. At opposite ends of portion 14 of each leg, an obliquely downwardly extending tooth 15 and an obliquely upwardly extending tooth 16 is provided. As may be seen best in Figure 3 of the drawing, teeth 15 and 16 of the legs 13 are adapted to extend behind and engage with the bumper 11 thereby to secure the impact member 10 in desired position on the bumper 11.

As will be observed from a cursory inspection of Figure 3 of the drawing, complementary teeth 15 and 16 of each leg 13 are spaced so that the minimum distance between each tooth 15 and its complementary tooth 16 is greater than the vertical width of bumper 11. The impact member 10 is retained in desired position on the bumper 11 by virtue of the fact that the vertical distance between each tooth 15 and its complementary tooth 16 is less than the vertical width dimension of the bumper 11.

Referring now to Figures 4 and 5 of the drawing, the manner in which the teeth 15 and 16 are hooked over the bumper 11 will be described. The impact member 10 in its normal unflexed position prior to being mounted on bumper 11 is of the shape shown by the full line in Figure 4. It is to be noted that the legs 13 of the member 10 in their unflexed position diverge at an angle greater than that maintained by the legs 13 in their mounted position, shown in Figure 1. The legs 13 are now sprung together until they have assumed the position shown by the dotted line in Figure 4 and the full line in Figure 5. In this position the vertical distance between each pair of complementary teeth is greater than the vertical width dimension of bumper 11. While the impact member 10 is in this position (that is as shown by the dotted line in Figure 4 and the full line in Figure 5), it is moved into desired position against the front face of bumper 11, the teeth 15 and 16 in this position being to the rear of bumper 11. The legs 13 of the impact member are then permitted to flex outwardly until they have assumed the position as indicated by the dotted line in Figure 5 and by the full line in Figure 1. This position is of course determined by the distance apart of each pair of complementary teeth 15 and 16. The legs 13 of impact member 10 will spread apart until the vertical distance between each pair of complementary teeth 15 and 16 at their base is the same as the vertical width dimension of bumper 11, (as may be seen best in Figure 3). The auxiliary impact member or guard 10 will now remain in desired position on bumper 11 until the legs 13 are again flexed inwardly. At which time, the impact member 10 may be removed from the bumper 11.

As will be readily understood by those skilled in the art, it is not necessary in order to carry out the cardinal features of the present invention to thin out the material of the member near its apex. This thinning out of the material of the impact member 10 near its apex 12, however, greatly facilitates the flexing of the legs 13 without detracting appreciably from the impact characteristics of the member.

From the above description, it will be seen that I have provided an extraordinary simple and yet effective auxiliary impact member or snap-on ornamental grille guard which may be economically manufactured, readily and quickly mounted by an unskilled person on a vehicle bumper, and which is rugged and reliable in use.

While I have shown a particular embodiment of my invention, it will, of course, be understood that I do not wish to be limited thereto since many modifications may be made and I therefore contemplate by the appended claims to cover all such modifications as fall within the true spirit and scope of my invention.

I claim as my invention:

1. As an article of manufacture for vehicle bumpers, an accessory adapted to increase the protection afforded by a bumper comprising a single resilient inverted V-shape member having bumper attaching means thereon including a pair of integral teeth on each leg of said member adapted to be hooked over and under a vehicle bumper by springing the legs of said member closer together and then permitting them to expand into hooked engagement with said bumper.

2. As an article of manufacture for vehicle bumpers, an accessory adapted to increase the protection afforded by a bumper comprising a single resilient inverted V-shape member having bumper attaching means thereon including an obliquely downwardly extending tooth and an obliquely upwardly extending tooth on each leg, said teeth being adapted to hook over and under a vehicle bumper by flexing the legs of said member together until the distance between said teeth is greater than the vertical width of said bumper.

3. As an article of manufacture for vehicle bumpers, an accessory adapted to increase the protection afforded by a bumper comprising a single resilient inverted V-shape member having bumper attaching means thereon including an obliquely downwardly extending tooth and an obliquely upwardly extending tooth on each leg, the minimum distance between said teeth being greater than the width of the bumper to which said accessory is to be attached, but the vertical distance between said teeth being less than the width of said bumper, said teeth being adapted to hook over and under a vehicle bumper by flexing the legs of said member together until the distance between said teeth is greater than the width of said bumper.

4. As an article of manufacture for vehicle bumpers, an accessory adapted to increase the protection afforded by a bumper comprising a single inverted V-shape member having bumper attaching means thereon including a pair of integral teeth on each leg of said member adapted to hook over and under a vehicle bumper and to constitute the sole attaching means therefor, the material of said member in proximity to the apex thereof being reduced in thickness, thereby to permit flexing of said member near its apex.

5. As an article of manufacture, a bumper guard having upright sections provided with vertical cut out portions to receive the bumper bar, and lip means constructed and arranged to be angled under pressure into wedged retaining engagement with the bumper guard, said upright sections also being provided with means for effecting said angling of the lip means.

6. As an article of manufacture, a bumper guard constructed to be applied vertically to the bumper bar and to be angled under pressure into wedged retaining engagement with the bar, said guard having angled portions movable in opposite directions to grip the bumper bar and impelled into operative gripping position by pressure applying means.

7. The combination with a bumper bar of a bumper guard apertured to fit over the opposite edges of the bar, said apertures extending transversely and diagonally of the bar so as to provide two longitudinally offset lip portions for engaging said opposite edges of the bar, said guard also being provided with means for stressing the same to cause said offset lip portions to be wedged into bumper guard retaining engagement with said opposite edges.

8. The combination with a horizontal bumper bar of a vertical impact guard including a plurality of upright portions joined at their upper extremities, each having a notch of a width to receive and accommodate the bar, said upright portions being provided with means for effecting relative movement between said upright portions of said bar to wedgingly interlock the notched parts of said upright portions into retaining engagement with said horizontal bar.

GEORGE ALBERT LYON.